(12) United States Patent
Ishizu et al.

(10) Patent No.: US 8,472,085 B2
(45) Date of Patent: Jun. 25, 2013

(54) IMAGE PROCESSING DEVICE, ADDITIONAL INFORMATION PROVIDING METHOD, AND COMPUTER-READABLE STORAGE MEDIUM

(75) Inventors: Taeko Ishizu, Kanagawa (JP); Yoshinaga Kato, Kanagawa (JP); Takahiro Yagishita, Kanagawa (JP); Katsumi Sayama, Kanagawa (JP); Tatsuo Nishimura, Tokyo (JP); Yukinori Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 12/539,656

(22) Filed: Aug. 12, 2009

(65) Prior Publication Data

US 2010/0046044 A1 Feb. 25, 2010

(30) Foreign Application Priority Data

Aug. 19, 2008 (JP) .................................. 2008-211092
Jul. 10, 2009 (JP) .................................. 2009-164032

(51) Int. Cl.
*H04N 1/40* (2006.01)
*H04N 1/387* (2006.01)
*H04N 1/04* (2006.01)

(52) U.S. Cl.
USPC ......... 358/3.28; 358/1.16; 358/474; 358/403; 358/453; 358/450; 358/448

(58) Field of Classification Search
USPC ............... 358/3.28, 1.13, 474, 450, 448, 403, 358/1.16, 453; 382/305, 306
See application file for complete search history.

(56) References Cited

U.S. PATENT DOCUMENTS

| 7,783,111 | B2 * | 8/2010 | Matsumoto .................... 382/190 |
| 8,049,917 | B2 * | 11/2011 | Noguchi et al. .............. 358/1.15 |
| 8,180,102 | B2 * | 5/2012 | Abe et al. ....................... 382/100 |
| 8,208,179 | B2 * | 6/2012 | Ishikawa et al. ............. 358/3.28 |
| 2004/0184065 | A1 | 9/2004 | Guan et al. |
| 2005/0254070 | A1 * | 11/2005 | Sayama ......................... 358/1.1 |
| 2006/0077419 | A1 | 4/2006 | Sugiura et al. |
| 2006/0279792 | A1 | 12/2006 | Ishizu et al. |
| 2007/0127077 | A1 * | 6/2007 | Tamura ......................... 358/3.28 |
| 2007/0177762 | A1 * | 8/2007 | Matsumoto ................... 382/100 |
| 2007/0297644 | A1 * | 12/2007 | Ishikawa et al. ............. 382/100 |
| 2008/0174811 | A1 * | 7/2008 | Tanaka et al. ................. 358/1.15 |
| 2008/0232639 | A1 * | 9/2008 | Ishikawa et al. ............. 382/100 |
| 2009/0147292 | A1 | 6/2009 | Shimura et al. |
| 2010/0194976 | A1 * | 8/2010 | Smith et al. ................... 348/373 |

(Continued)

FOREIGN PATENT DOCUMENTS

| JP | 2004-201069 | 7/2004 |
| JP | 2006-121655 | 5/2006 |
| JP | 2008-035491 | 2/2008 |
| JP | 2008-085579 | 4/2008 |

*Primary Examiner* — Cheukfan Lee
(74) *Attorney, Agent, or Firm* — IPUSA, PLLC

(57) ABSTRACT

An image processing device provides a detection result of additional information added to each of pages which constitute a document. The image processing device includes an input part which inputs image data of each page of a document. A detection part generates a page detection result of additional information added to the image data, the page detection result being generated on a page basis and indicating a result of detection of the additional information for each page. A detection result output part outputs an outline result indicating an outline of the page detection results for the respective pages on a document basis, together with an identifier of the document associated with the outline result.

15 Claims, 14 Drawing Sheets

U.S. PATENT DOCUMENTS

| | | | |
|---|---|---|---|
| 2011/0047454 A1* | 2/2011 | Sugimoto | 715/243 |
| 2011/0141507 A1* | 6/2011 | Kawaura | 358/1.13 |
| 2012/0092709 A1* | 4/2012 | Maeda et al. | 358/1.15 |
| 2012/0159618 A1* | 6/2012 | Ohba et al. | 726/19 |
| 2012/0221947 A1* | 8/2012 | Yukumoto et al. | 715/273 |

* cited by examiner

FIG.4

| JOB ID | DETECTION TIME | JOB OUTLINE RESULT | PAGE NO. | PAGE DETECTION RESULT |
|---|---|---|---|---|
| 1 | 2008/04/20 10:13 | FALSIFICATION IS NOT DETECTED | 1 | FALSIFICATION IS NOT DETECTED |
| | | | 2 | FALSIFICATION IS NOT DETECTED |
| | | | 3 | FALSIFICATION IS NOT DETECTED |

FIG.5

| JOB ID | DETECTION TIME | JOB OUTLINE RESULT | PAGE NO. | PAGE DETECTION RESULT |
|---|---|---|---|---|
| 1 | 2008/04/20 10:13 | SEE DETAILS | 1 | FALSIFICATION IS NOT DETECTED |
| | | | 2 | FALSIFICATION IS NOT DETECTED |
| | | | 3 | FALSIFICATION IS NOT DETECTED |
| | | | 4 | INFORMATION FOR DETECTING FALSIFICATION IS NOT ADDED |
| | | | 5 | FALSIFICATION IS NOT DETECTED |
| | | | 6 | FALSIFICATION IS NOT DETECTED |
| | | | 7 | FALSIFICATION IS NOT DETECTED |
| | | | ... | ... |
| | | | 100 | FALSIFICATION IS NOT DETECTED |

FIG.6

| JOB ID | DETECTION TIME | JOB OUTLINE RESULT | PAGE NO. | PAGE DETECTION RESULT |
|---|---|---|---|---|
| 1 | 2008/04/20 10:13 | SEE DETAILS | 1 | FALSIFICATION IS NOT DETECTED |
| | | | 2 | FALSIFICATION IS NOT DETECTED |
| | | | 3 | FALSIFICATION IS NOT DETECTED |
| | | | 4 | INFORMATION FOR DETECTING FALSIFICATION IS NOT ADDED |
| | | | 5 | FALSIFICATION IS DETECTED |
| | | | 6 | ADDITIONAL INFORMATION IS NOT ADDED |
| | | | 7 | ADDITIONAL INFORMATION CANNOT BE EXTRACTED |
| | | | ... | ... |
| | | | 100 | FALSIFICATION IS NOT DETECTED |
| 2 | 2008/04/15 14:30 | FALSIFICATION IS NOT DETECTED | 1 | FALSIFICATION IS NOT DETECTED |
| | | | ... | ... |
| | | | 50 | FALSIFICATION IS NOT DETECTED |
| 3 | 2008/04/20 15:20 | FALSIFICATION IS NOT DETECTED | 1 | FALSIFICATION IS NOT DETECTED |
| | | | ... | ... |
| | | | 200 | FALSIFICATION IS NOT DETECTED |
| 4 | 2008/04/30 13:40 | SEE DETAILS | 1 | FALSIFICATION IS NOT DETECTED |
| | | | ... | ... |
| | | | 100 | FALSIFICATION IS DETECTED |

IMAGE PROCESSING DEVICE, ADDITIONAL INFORMATION PROVIDING METHOD, AND COMPUTER-READABLE STORAGE MEDIUM

BACKGROUND OF THE INVENTION

1. Field of the Invention

This invention relates to an image processing device, an additional information providing method, and a computer-readable storage medium, which are adapted to provide a detection result of additional information which may be added to every page of a document.

2. Description of the Related Art

In recent years, electronic information which is created by another person can be easily acquired with development of information networks. Although the acquisition of electronic information is made easy, there is a problem that the acquired electronic information may be altered without receiving approval of the author.

To eliminate the problem, an apparatus and method of detecting a falsification is proposed, wherein an electronic watermark (additional information) is added to image data and detection of a falsification is carried out based on the additional information added to the image data. For example, Japanese Laid-Open Patent Publication No. 2006-121655 discloses an apparatus and method of this type.

Moreover, in recent years, with the spread of image forming devices with a copying function, the copying of a document by an image forming device is easily carried out. Although the reproduction of a document is made easy, there is a problem that a document on which image data of confidential information is printed may also be reproduced illegally.

To eliminate the problem, an apparatus and method of inhibiting the reproduction of a document is proposed, wherein security information (additional information) is added to image data of a document and the reproduction of the document is inhibited based on the additional information added to the image data. For example, Japanese Laid-Open Patent Publication No. 2004-201069 and Japanese Laid-Open Patent Publication No. 2008-035491 disclose an apparatus and method of this type.

Generally, the additional information added to image data on a page basis (or on a page number basis) is detected and a detection result history list on a job basis (or on a job ID basis) is generated based on the detection results on a page basis for all the pages of a document.

FIG. 14 illustrates an example of a detection result history list on a job basis according to the related art (in a case of falsification detection).

In the following, the term "page basis" relates to one of front and back surfaces of each sheet of physical recording sheets which constitute a document. For example, in a case of PDF (portable document format) data, the term "page basis" relates to one of a set of page images of the PDF data displayed on a display device in a page-by-page manner.

In the following, the term "job basis" relates to the whole document. For example, in a case of a document containing 100 pages, the term "job basis" relates to image processing of the whole document which is started with a 1st page image data of the document and terminated with a 100th page image data of the document.

In a case of the detection result history list on a job basis as illustrated in FIG. 14, there is a problem that, if the user views the job outline result history screen, the user is unable to clearly grasp the detection result of the document. This will require the user to check a document (job) the detection result of which the user does not have to view.

That is, if the user does not check the respective page detection results on a page basis, the user is unable to grasp whether the document contains a falsification. For example, in the case of the detection result list on a job basis as illustrated in FIG. 14, if the page detection results on a page basis include irregular detection results (such as "information for detecting falsification is not added", "additional information is not added", "additional information cannot be extracted", and "falsification is detected" as in FIG. 14), the user has to further check the detection result detailed list on a page basis, in order to grasp the irregular detection result.

SUMMARY OF THE INVENTION

In one aspect of the invention, the present disclosure provides an image processing device, an additional information providing method, and a computer-readable storage medium which enable a user to grasp immediately the outline of page detection results of additional information added to respective pages of a document.

In an embodiment of the invention which solves or reduces one or more of the above-mentioned problems, the present disclosure provides an image processing device which provides a detection result of additional information added to each of one or more pages which constitute a document, the image processing device including: an input part which inputs image data of each page of the document; a detection part which generates a page detection result of additional information added to the image data, the page detection result being generated on a page basis and indicating a result of detection of the additional information for each page; and a detection result output part which outputs an outline result indicating an outline of the page detection results for the respective pages on a document basis, together with an identifier of the document associated with the outline result.

In an embodiment of the invention which solves or reduces one or more of the above-mentioned problems, the present disclosure provides an additional information providing method for an image processing device which provides a detection result of additional information added to each of one or more pages which constitute a document, the method including: inputting, by an input part of the image processing device, image data of each page of the document; generating, by a detection part of the image processing device, a page detection result of additional information added to the image data, the page detection result being generated on a page basis and indicating a result of detection of the additional information for each page; and outputting, by a detection result output part of the image processing device, an outline result indicating an outline of the page detection results for the respective pages on a document basis, together with an identifier of the document associated with the outline result.

Other objects, features and advantages of the present invention will become more apparent from the following detailed description when read in conjunction with the accompanying drawings.

BRIEF DESCRIPTION OF THE DRAWINGS

FIG. 4 is a diagram illustrating an example of a page detection result (when falsification detection is not performed) stored in a detection result storing part.

FIG. 5 is a diagram illustrating an example of a page detection result (in the case of falsification detection) stored in the detection result storing part.

FIG. 6 is a diagram illustrating an example of a page detection result (in the case of falsification detection) stored in the detection result storing part.

DETAILED DESCRIPTION OF THE PREFERRED EMBODIMENTS

A description will be given of embodiments of the invention with reference to the accompanying drawings.

Figure 1:
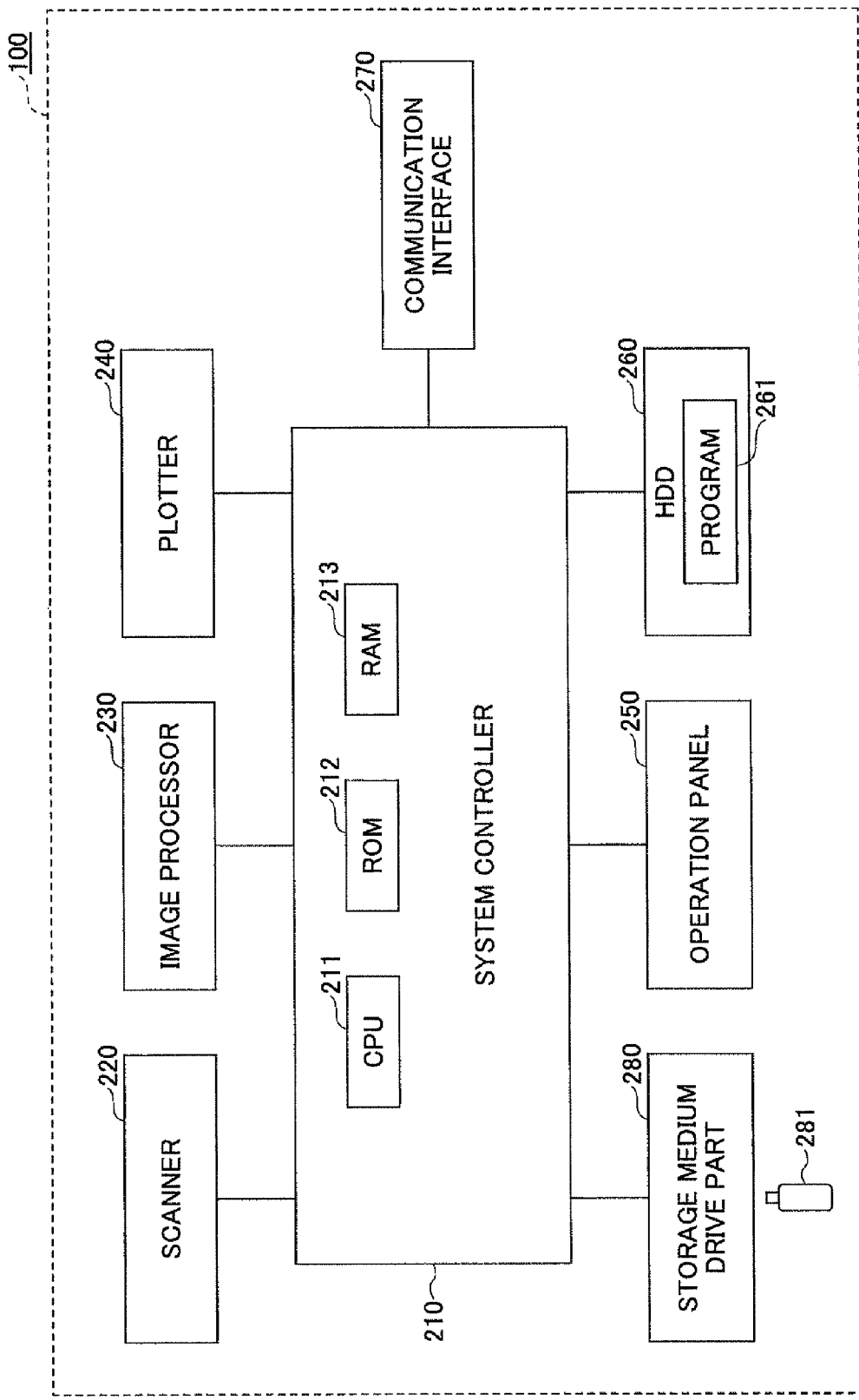
FIG. 1 is a block diagram illustrating the hardware composition of a multi-function peripheral which is an image processing device of an embodiment of the invention.

First, the hardware composition of a multi-function peripheral 100 which is an image processing device of an embodiment of the invention will be described with reference to FIG. 1. FIG. 1 illustrates the hardware composition of the multi-function peripheral 100 of this embodiment.

The multi-function peripheral 100 of this embodiment includes a system controller 210, a scanner 220, an image processor 230, a plotter 240, an operation panel 250, a HDD 260, and a communication interface 270, as illustrated in FIG. 1.

The system controller 210 includes a CPU 211, a RON 212, and a RAM 213, and controls the multi-function peripheral 100.

The CPU 211 reads a program from the ROM 212 or the HDD 260, and loads and executes the read program on the RAM 213, for example. The CPU 211 loads on the RAM 213 the image data input from communication interface 270, and performs various kinds of processing using the loaded image data.

The scanner 220 performs image reading processing. The scanner 220 reads image data for every page of a document, and inputs the read image data to a storage unit, such as the RAM 213 or the HDD 266.

The image processor 230 performs image processing. The image processor 230 performs the image processing of the image data input to the storage, such as the RAM 213 or the HDD 266.

The plotter 240 performs image formation processing. The plotter 240 generates raster data from the image data the image processing of which is performed by the image processor 230, and performs image formation by using an electrophotographic printing process or an ink-drop discharging process.

The operation panel 250 displays the information notified from the system controller 210, or notifies the information input by the user to the system controller 210.

The HDD 266 stores various kinds of data and programs. The communication interface 270 communicates with an information processing device or other communication devices.

Figure 2:
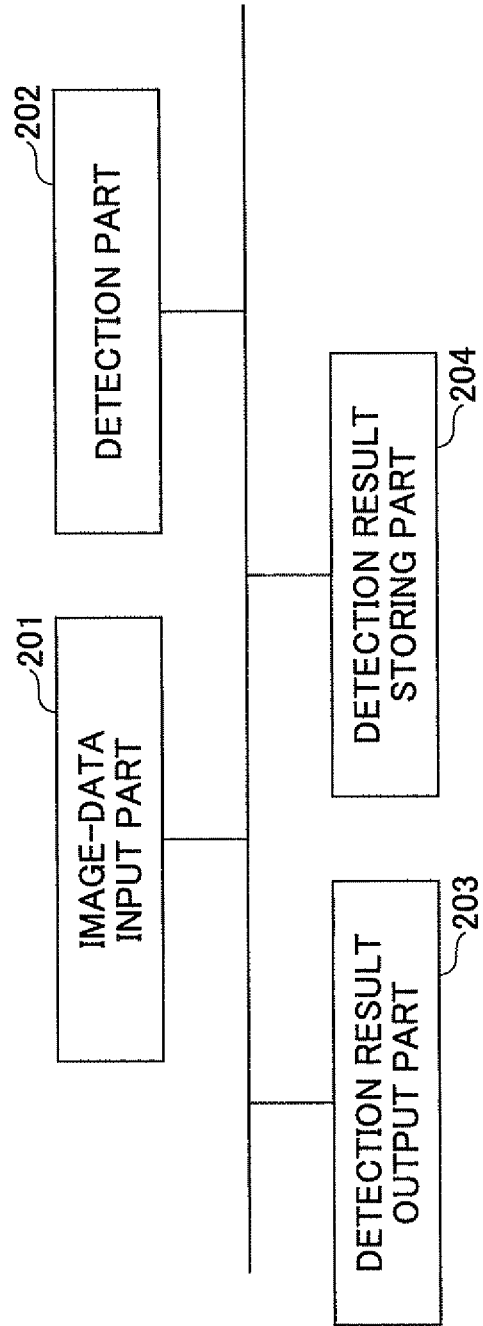
FIG. 2 is a block diagram illustrating the functional composition of an image processing device of an embodiment of the invention.

Next, the functional composition of the image processing device of this embodiment will be described with reference to FIG. 2. FIG. 2 illustrates the functional composition of the image processing device of this embodiment.

The image processing device of this embodiment includes an image-data input part 201, a detection part 202, a detection result output part 203, and a detection result storing part 204.

The image-data input part 201 functions as an input unit which inputs image data. The image-data input part 201 acquires the image data of each page which constitutes a document, and inputs the acquired image data to the detection part 202.

The image-data input part 201 is constituted by the scanner 220, the communication interface 270, the HDD 260, and the system controller 210 illustrated in FIG. 1. For example, the CPU 211 of the system controller 210 acquires image data from the scanner 220 or the communication interface 270, and inputs the acquired image data to the RAM 213 or the HDD 266 of the system controller 210.

The detection part 202 functions as a detection unit which performs detection of additional information. The detection part 202 performs the detection process of the additional information added to each page, based on the image data input by the image-data input part 201, and generates the detection result of each page. The detection part 202 is constituted by the system controller 210 illustrated in FIG. 1.

The detection result output part 203 functions as a data output unit which outputs a detection result. The detection result output part 203 outputs the detection result based on the detection process performed by the detection part 202.

The detection result output part 203 outputs a detection result of every page (page detection result) generated by the detection part 202, and outputs a job outline result generated based on the detection results of a plurality of pages of a document.

An example of a job outline result will be described later. This job outline result includes the information indicating whether a page whose content might be altered is contained in one document.

The detection result output part 203 is constituted by the system controller 210, the operation panel 250, and the communication interface 270 illustrated in FIG. 1. For example, the CPU 211 of the system controller 210 outputs the page detection result and the job outline result, which are stored in the RAM 213 or the HDD 266, to the operation panel 250, or outputs them to another communication device via the communication interface 270.

The detection result storing part 204 functions as a storage unit that stores the detection result. The detection result storing part 204 stores the detection result based on the detection process performed by the detection part 202.

The detection result storing part 204 is constituted by the system controller 210 and the HDD 266 illustrated in FIG. 1. For example, the CPU 211 of the system controller 210 stores the page detection result and the job outline result in the RAM 213, or stores them in the HDD 266.

Figure 3:
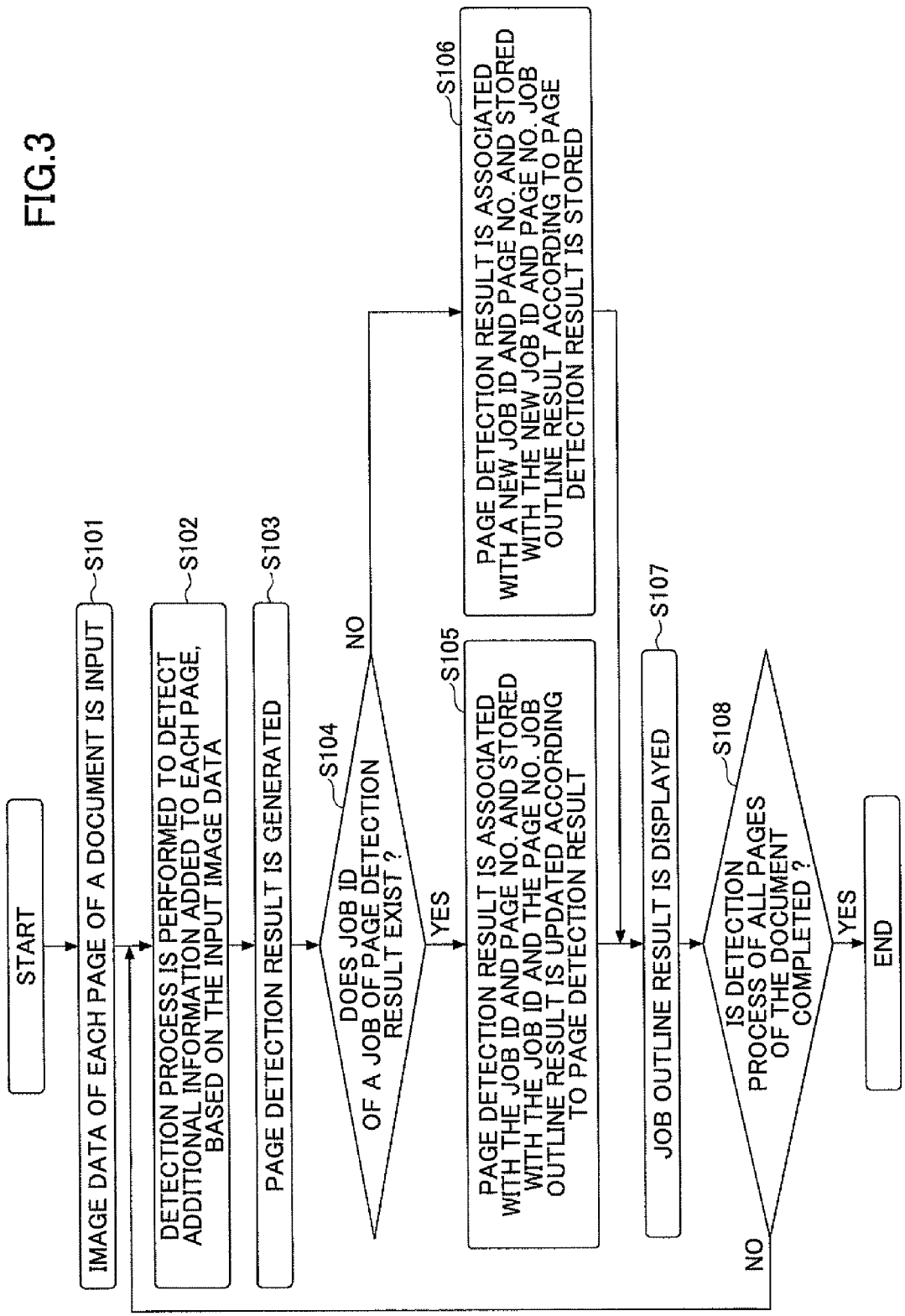
FIG. 3 is a flowchart for explaining a process which is performed by the image processing device of this embodiment.

Next, a process performed by the image processing device of this embodiment will be described with reference to FIG. 3. FIG. 3 is a flowchart for explaining the process performed by the processing device of this embodiment.

In the following, the term "job" typically indicates a unit of image processing which is performed for all pages of a document. For example, in a case of a document which includes 100 pages, the job in this case is a unit of image-processing which is started with an image processing of image data of a 1st page and terminated with image processing of image data of a 100th page. In this connection, a job ID is an identifier which uniquely identifies a job for performing image processing of all pages of a document. A document may be composed of a set of two or more pages each of which contains any of a text, an image, a figure, etc. arbitrarily and the image data of the pages may be different from each other.

The process of FIG. 3 is started when a request for executing detection of a document to which a job ID is assigned is received. Upon start of the process, the image-data input part 201 acquires image data of each of pages which constitute the document (or acquires image data on a document basis), and inputs the acquired image data into the detection part 202 (step S101). The job ID which is assigned by the image-data input part 201 in this case is a consecutive number which does not overlap with another job ID.

In this case, the method of acquisition of image data used by the image-data input part 201 is not restricted. It is not necessary to use a particular method of acquisition of image data. Any method of acquisition of image data is applicable to the image-data input part 201, if the method is able to acquire image data of each of pages which constitute a document.

The detection part 202 performs the process of detecting additional information added to the image data of one page input by the image-data input part 201 (step S102), and generates a detection result on a page basis (page detection result) (step S103). The process of detecting additional information and the process of generating a page detection result will be described later.

The detection part 202 associates the page detection result with the job ID and the page number, and stores the same in the detection result storing part 204.

The detection part 202 determines whether a job ID of the job which includes the page of the page detection result generated at step S103 already exists in the detection result storing part 204 (step S104). This step S104 is to determine whether the detection of at least one page of the same job (document) is already performed.

When the job ID of the job including the page of the generated page detection result does not exist in the detection result storing part 204 (step S104/No), it means that it means that the process of detection of additional information for one job is completed. In other words, it means that the process of detection of additional information for a new job is started. The detection part 202 associates the page detection result, generated at step S103, with the job ID and the page number corresponding to the page detection result, and stores the page detection result in the detection result storing part 204 (step S106). Moreover, the detection part 202 associates a job outline result according to the page detection result generated at step S103, with the job ID, and stores the job outline result in the detection result storing part 204 (step S160). This job outline result is a detection result indicating the outline of page detection results on a job basis (or a document basis).

When the job ID of the job including the page of the generated page detection result already exists in the detection result storing part 204 (step S104/Yes), the detection part 202 associates the page detection result (generated at step S103) with the job ID (which is determined at step S104 as already existing) and the page number, and stores the same in the detection result storing part 204 (step S105). Moreover, the detection part 202 updates the job outline result (stored in the detection result storing part 204) according to the page detection result generated at step S103 (step S105). This updating may include overwriting the same job outline result to the detection result storing part 204.

FIG. 4 illustrates an example of a page detection result (when falsification detection is not yet performed) stored in the detection result storing part 204. For example, it is assumed that all the page detection results associated with the job ID and stored in the detection result storing part 204 indicate that "falsification is not detected", and the job outline result indicates that "falsification is not detected" as illustrated in FIG. 4.

As illustrated in FIG. 4, when the job outline result indicates that "falsification is not detected", it means that any irregular detection result does not exist in all the page detection results. An irregular detection result means any page detection result other than "falsification is not detected", and a normal detection result means the page detection result of "falsification is not detected".

For example, in the state as illustrated in FIG. 4, if a page detection result of a 4th page, newly generated at step S103, indicates that "information for detecting falsification is not added" instead of "falsification is not detected", the detection part 202 associates the "information for detecting falsification is not added" (which was generated at step S103) with the job ID and the page number, and stores the same in the detection result storing part 204. Moreover, the detection part 202 updates the job outline result of "falsification is not detected" to "see details".

FIG. 5 illustrates an example of a page detection result of the detection result storing part 204 in which the job outline result is updated. Because the page detection result of the 4th page indicates the "information for detecting falsification is not added", the job outline result is updated to "see details" as illustrated in FIG. 5.

When the job outline result is "see details", it means that an irregular detection result exists in a part of the page detection results. Hence, the job outline result serves as information which requests the user to check the page detection results.

In this manner, if an irregular page detection result exists in a part of the page detection results, the detection part 202 updates the previous job outline result to a new job outline result indicating the irregularity. After an irregular page detection result is detected, the detection part 202 will not update the job outline result even if a normal page detection result is detected. Therefore, even if a page detection result of a 5th page indicates that "falsification is not detected", the job outline result "see details" remains unchanged as illustrated in FIG. 5.

When no irregular detection result exists in all the page detection results, the detection part 202 updates the previous job outline result in the detection result storing part 204 to the new job outline result indicating that "falsification is not detected" whenever a page detection result is generated for each page.

Next, the detection result output part 203 displays the job outline result stored in the detection result storing part 204 (step S107).

For example, it is assumed that a page detection result and a job outline result are stored in the detection result storing part 204 as illustrated in FIG. 6. FIG. 6 illustrates an example of a page detection result (in the case of falsification detection) stored in the detection result storing part 204.

Figure 7:
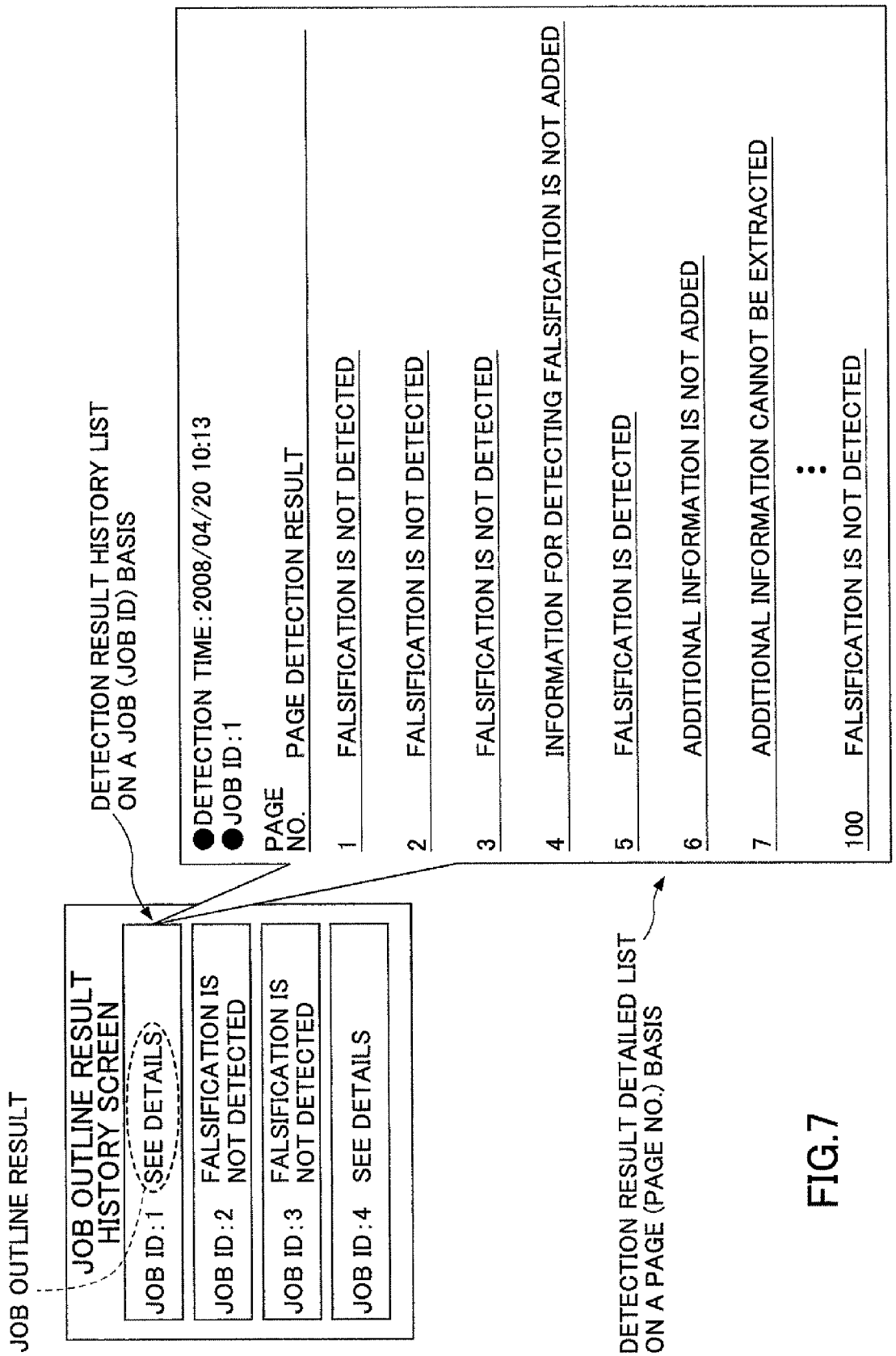
FIG. 7 is a diagram illustrating an example of a detection result history list on a job basis (in the case of falsification detection).

In this case, the detection result output part 203 reads the job outline result of job ID=1 from the detection result storing part 204, and displays the "detection result history list on a job basis (on a job ID basis)" illustrated in FIG. 7 on the operation panel 250. FIG. 7 illustrates an example of a detection result history list on a job basis (in the case of falsification detection).

The "detection result history list on a job basis (on a job ID basis)" illustrated in FIG. 7 includes a job outline result indicating the outline of page detection results on a page basis (on a page number basis). For this reason, viewing the "job outline result" illustrated in FIG. 7 briefly, the user can grasp the detection result of a document from the outline of page detection results on a page basis.

In the example of FIG. 7, because some irregular detection results ("information for detecting falsification is not added", "falsification is detected", "additional information is not added", "additional information cannot be extracted", etc.) are included in the page detection results of the 4th to 7th pages of job ID=1, the job outline result of job ID=1 is changed to indicate "see details" as illustrated in FIG. 7. When the job outline result indicates "see details", it means that an irregular detection result is included in a part of the page detection results.

In the example of FIG. 7, all the page detection results of job ID=2 and job ID=3 indicate that "falsification is not detected", and the job outline results of job ID=2 and job ID=3 also indicate that "falsification is not detected". When the job outline result indicates that "falsification is not detected", it means that no irregular detection result exists in the page detection results.

In the example of FIG. 7, the page detection results of job ID=4 include at least one irregular page detection result, and the job outline result of job ID=4 is changed to indicate "seeing details".

In the example of FIG. 7, if at least one irregular detection result ("information for detecting falsification is not added", "falsification is detected", "additional information is not added", or "additional information cannot be extracted") is included in the page detection results of one document, the detection result output part 203 displays the job outline result indicating "see details". However, only a typical example of the relation between the page detection results and the job outline result is illustrated. The detection result output part 203 may be configured to display a job outline result indicating the outline of page detection results of respective pages of a document.

Alternatively, the detection result output part 203 may be configured to display the job outline result indicating "see details" only when the page detection result indicating "falsification is detected" is included in the page detection results. In this case, the user may be requested to view the page detection results only when a falsification is certainly detected.

Alternatively, the detection result output part 203 may be configured to display a job outline result indicating that "the document contains a page the falsification detection of which is impossible and please see details" when the page detection result which indicates any one of "information for detecting falsification is not added", "additional information is not added" and "additional information cannot be extracted" is included in the page detection results. In this case, why the falsification detection cannot be performed is self-explanatory to the user, and the user may cancel checking of the details.

Alternatively, the detection result output part 203 may be configured to display a job outline result with a page number.

For example, when the page detection result of the 1st page indicates that "falsification is detected", the detection result output part 203 displays the job outline result indicating "job ID=1: see details, page 1". In this case, viewing the job outline result with the page number, the user can easily grasp which page of the document should be checked.

Referring back to FIG. 3, after the step S107 is performed, the detection part 202 determines whether the detection process of all the additional information added to the pages of the document is completed (step S108).

When it is determined that the detection process of all the additional information added to the pages of the document is not completed (step S108/No), the steps S102-S107 are continued until the detection process of all the additional information added to the pages of the document is completed.

On the other hand, when it is determined that the detection process of all the additional information added to the pages of the document is completed (step S108/Yes), the process of FIG. 3 is terminated.

Next, the process of detecting additional information at the step S102 and the process of generating a page detection result at the step S103 as illustrated in FIG. 3 will be described with reference with FIG. 8 and FIG. 10, respectively.

Figure 8:
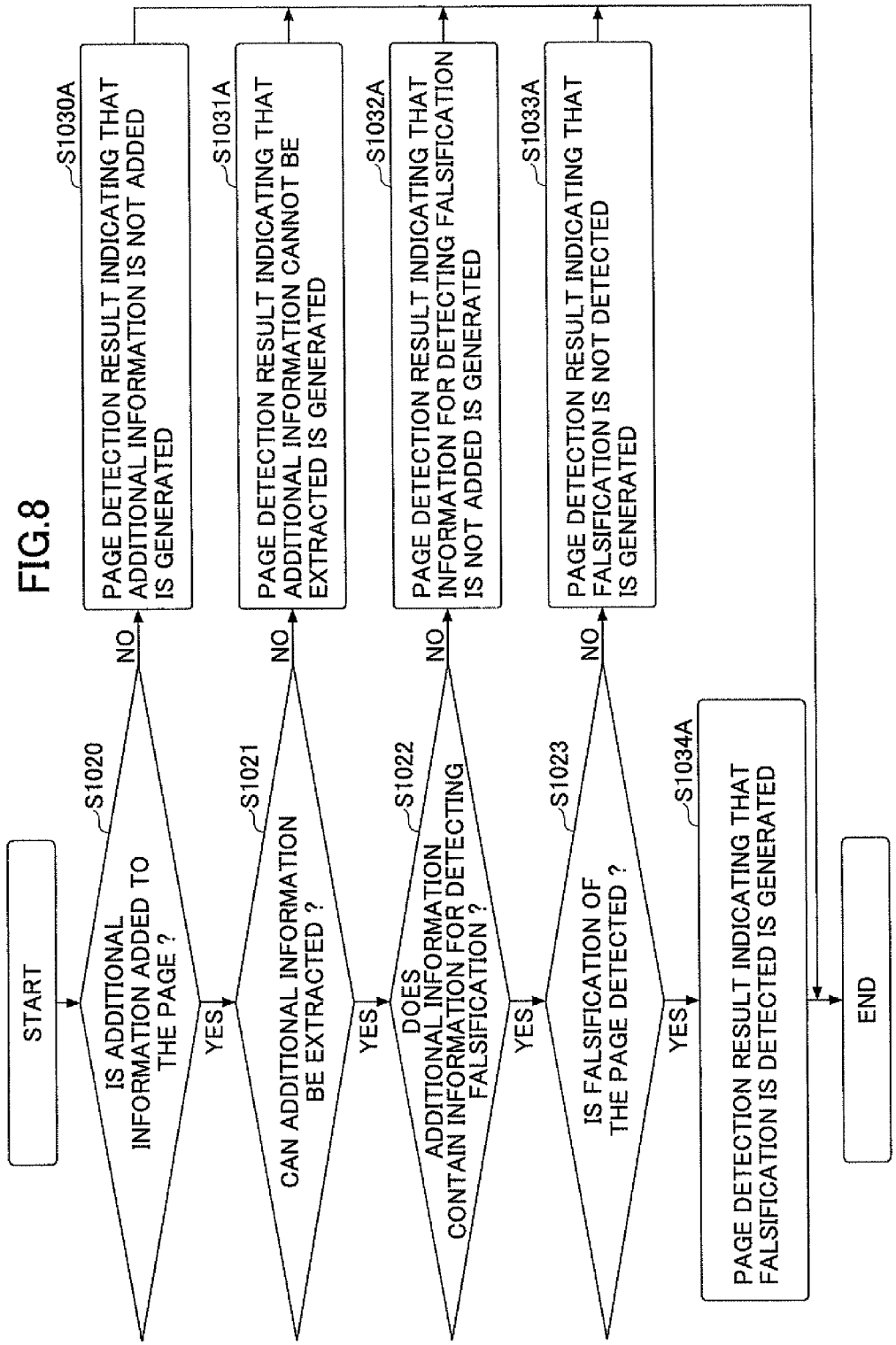
FIG. 8 is a flowchart for explaining a process of falsification detection.
Figure 10:
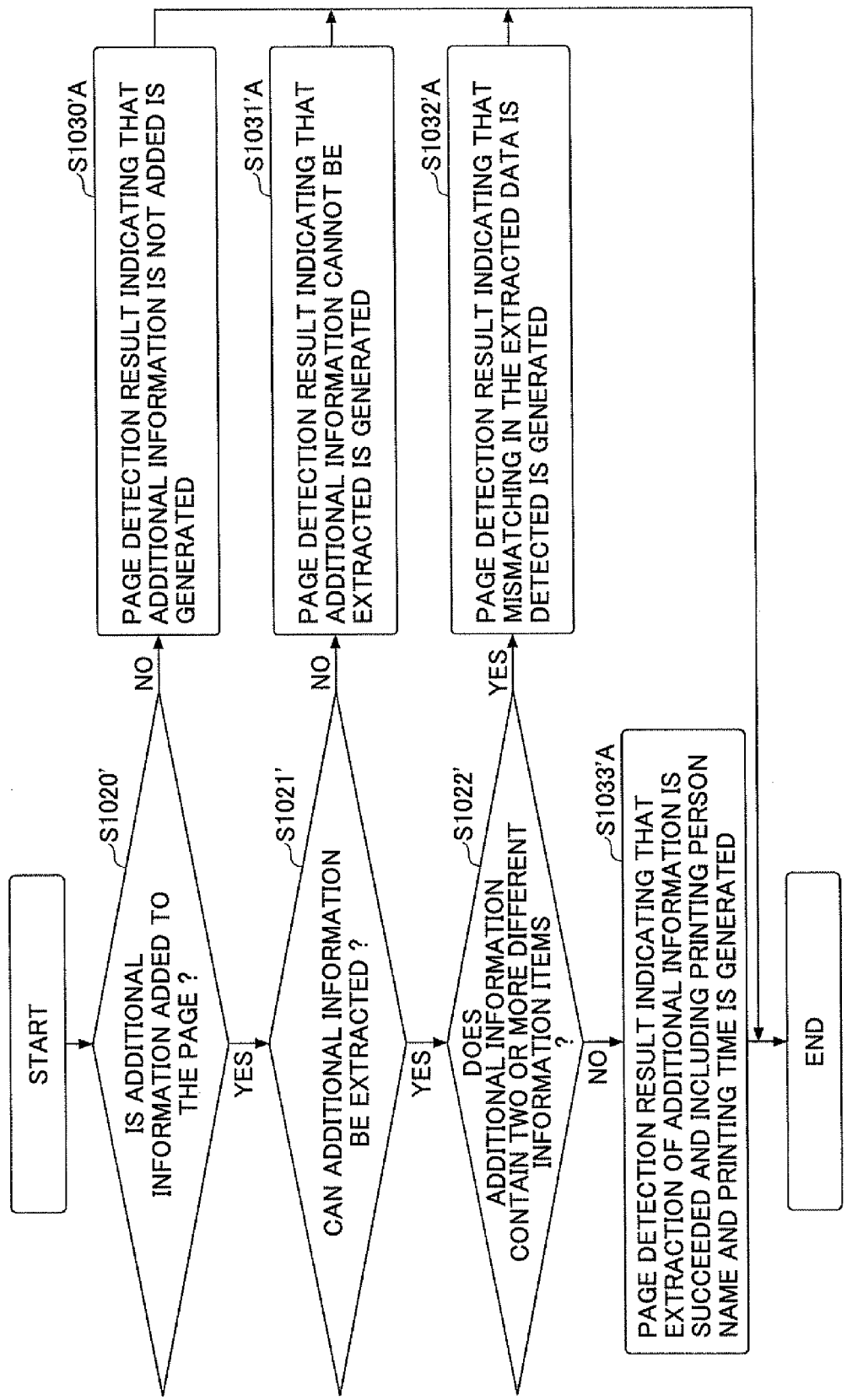
FIG. 10 is a flowchart for explaining a detection process of security trace.

FIG. 8 is a flowchart for explaining the process of falsification detection, and FIG. 10 is a flowchart for explaining the detection process of security trace.

The detection process of security trace is a function to specify who printed a document (paper document) and when the document was printed. The security trace detection function may also be called "printing person information detecting function" or "leakage trace function".

The process of falsification detection will be described with reference to FIG. 8. The additional information used in the process of falsification detection includes an electronic watermark, other information for detecting falsification, bibliographic items, etc.

Upon start of the process of FIG. 8, the detection part 202 determines whether additional information is added to a page (step S1020).

When additional information is not added to the page (step S1020/No), the detection part 202 generates a page detection result indicating that "additional information is not added" (step S1030A).

When additional information is added to the page (step S1020/Yes), the detection part 202 determines whether the additional information added to the page can be extracted (step S1021).

When the additional information added to the page cannot be extracted (step S1021/No), the detection part 202 generates a page detection result indicating that "additional information cannot be extracted" (step S1031A).

When the additional information added to the page can be extracted (step S1021/Yes), the detection part 202 determines whether the information for detecting falsification exists in the extracted additional information (step S1022).

When the information for detecting falsification does not exist in the extracted additional information (step S1022/No), the detection part 202 generates a page detection result indicating that "information for detecting falsification is not added" (step S1032A).

When the information for detecting falsification exists in the extracted additional information (step S1022/Yes), the detection part 202 determines whether a falsification exists in the page based on the information for detecting falsification, (step S1023). The detection part 202 compares first image data that is restored from the information for detecting falsification with second image data that is acquired from the page.

When no difference between the first image data and the second image data is detected and it is determined that no falsification exists in the page, (step S1023/No), the detection part 202 generates a page detection result indicating that "falsification is not detected" (step S1033A).

When a difference between the first image data and the second image data is detected and it is determined that a falsification exists in the page (step S1023/Yes), the detection part 202 generates a page detection result indicating that "falsification is detected" (step S1034A).

Accordingly, the detection part 202 generates one page detection result from among the five page detection results at the steps S1030A-S1034A in the process of falsification detection as illustrated in FIG. 8.

Next, a detection result history list which is accumulated based on the page detection results of falsification detection generated by the process of FIG. 8 will be described with reference to FIG. 9.

Figure 9:
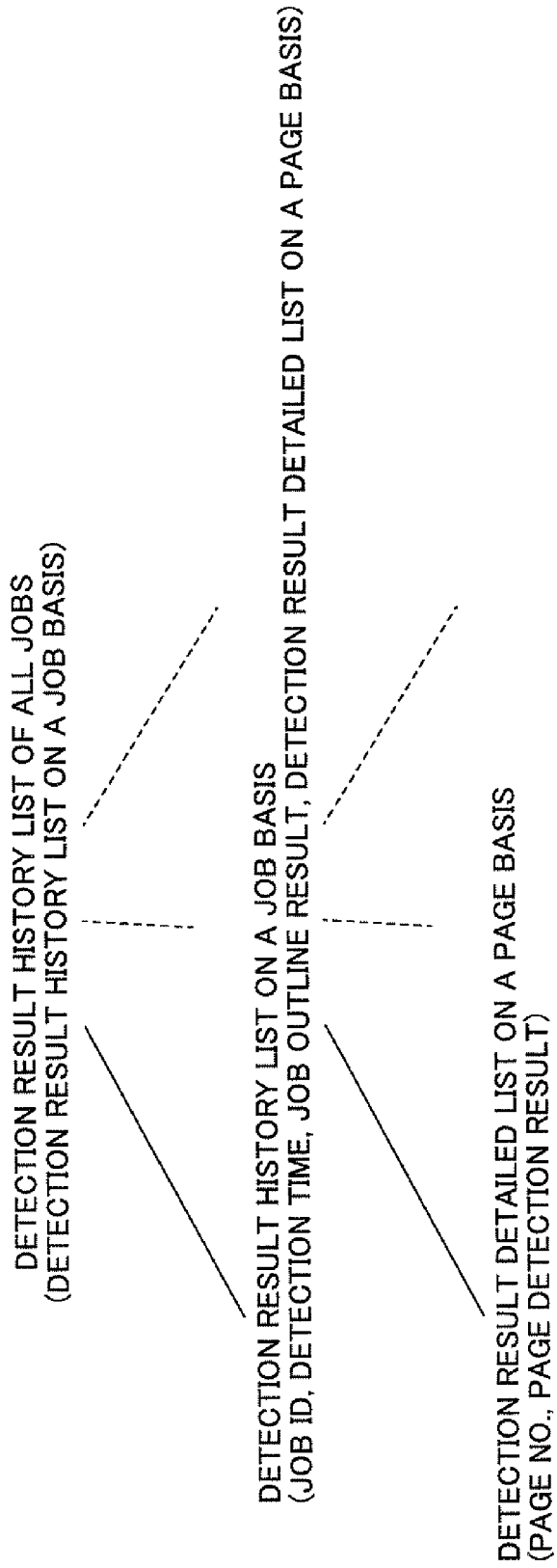
FIG. 9 is a diagram illustrating an example of a detection result history list of falsification detection.

FIG. 9 illustrates an example of a detection result history list of falsification detection. As illustrated in FIG. 9, the detection result history list of falsification detection includes a "detection result history list of all jobs".

The "detection result history list of all jobs" includes a plurality of "detection result history lists on a job basis". Each "detection result history list on a job basis" includes a "job ID", a "detection time", a "job outline result", and a plurality of "detection result detailed lists on a page basis".

The page detection result of falsification detection generated by the process of FIG. 8 constitutes a "detection result detailed list on a page basis".

The "job ID" is the information for specifying the detection result history list on a job basis. The "detection time" is the information for specifying the detection time of falsification detection on a job basis. The "job outline result" is the information for specifying the outline (outline result) of the detection result on a job basis.

Each "detection result detailed list on a page basis" includes a "page number" and a "page detection result". The "page number" is the information for specifying the detection result detailed list on a page basis. The "page detection result" is the information for specifying the detection result on a page basis. Examples of the page detection result include "information for detecting falsification is not added", "falsification is not detected", "falsification is detected", "additional information is not added", "additional information cannot be extracted", "a job is stopped because an error has occurred", etc.

In this embodiment, when at least one among the page detection results respectively indicating that "information for detecting falsification is not added", "additional information is not added", "falsification is detected", "additional information cannot be extracted" and "job is stopped because an error has occurred" is detected, the detection part 202 determines that an irregular detection result exists in the page detection results, and updates the job outline result to "see details". On the other hand, when only the page detection result indicating that "falsification is not detected" is detected, the detection part 202 determines that no irregular detection result exists in the page detection results, and updates the job outline result to "falsification is not detected".

Next, the detection process of security trace performed by the image processing device of this embodiment will be described with reference to FIG. 10.

The additional information which is used in the detection process of security trace includes the information for specifying a leaking source, such as a "printing person name", a "printing time", a "printing job log ID", etc., and the bibliographic items. From the "printing person name" and the "printing time" included in the additional information, it is possible to specify who printed a document (paper document) and when the document was printed. If there is a page which does not contain a "printing person name" or a "printing time" in the additional information, or if the additional information itself is not added to the page, it can be concluded that there is a possibility that the additional information to the page is illegally processed in order to hide the source.

Upon start of the process of FIG. 10, the detection part 202 determines whether additional information is added to a page (step S1020').

When any additional information is not added to the page (step S1020'/No), the detection part 202 generates a page detection result indicating that "additional information is not added" (step S1030'A).

When additional information is added to the page (step S1020'/Yes), the detection part 202 determines whether the additional information added to the page can be extracted (step S1021').

When the additional information added to the page cannot be extracted (step S1021'/No), the detection part 202 generates a page detection result indicating that "additional information cannot be extracted" (step S1031'A).

When the additional information added to the page can be extracted (step S1021'/Yes), the detection part 202 detects an integrity of a printing person name or a printing time of the extracted additional information. Specifically, the detection part 202 determines whether two or more different information items (a printing person name or a printing time) exist in the extracted additional information (step S1022').

When two or more different information items exist in the extracted additional information (step S1022'/Yes), the detection part 202 generates a page detection result indicating that "mismatching in the extracted data is detected" (step S1032'A).

When any different information items are not detected in the extracted additional information (step S1022'/No), the detection part 202 generates a page detection result indicating that "additional information can be extracted" (step S1033'A).

Accordingly, the detection part 202 generates one page detection result from among the four page detection results at the steps S1030'A-S1033'A in the detection process of security trace illustrated in FIG. 10.

Figure 11:
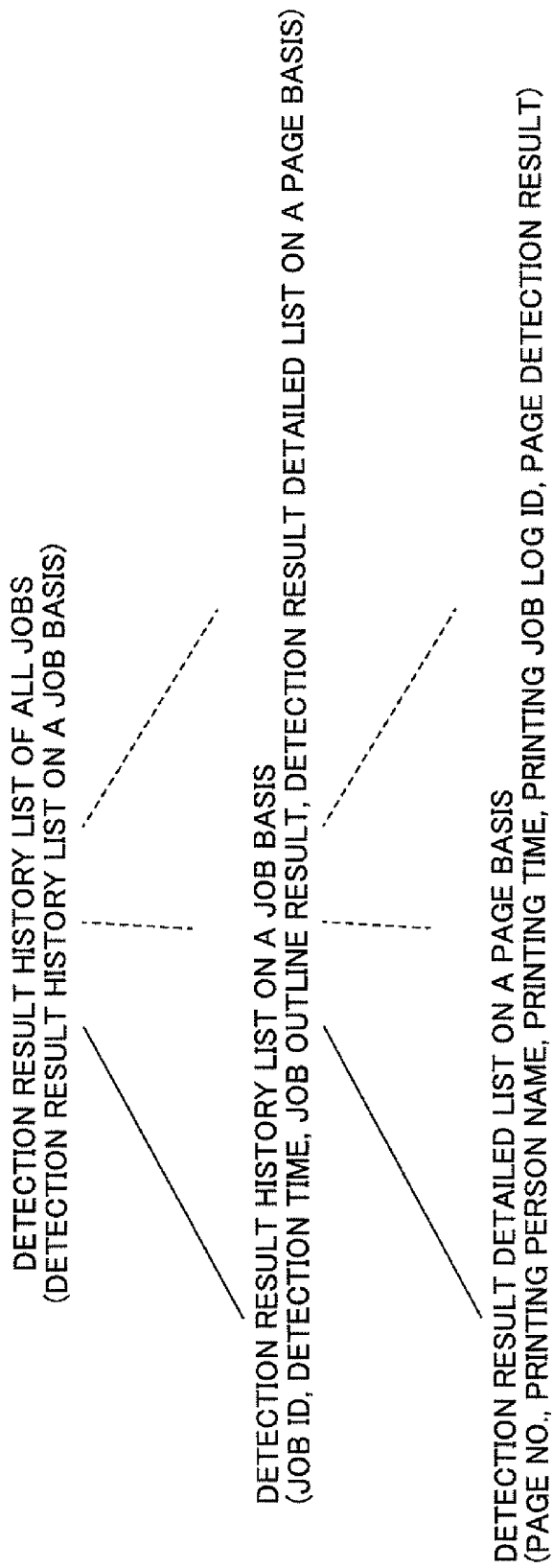
FIG. 11 is a diagram illustrating an example of a detection result history list of security trace.

Next, a detection result history list which is accumulated based on the results of the detection process of security trace generated by the process of FIG. 10 will be described with reference to FIG. 11. FIG. 11 illustrates an example of a detection result history list of security trace.

As illustrated in FIG. 11, the detection result history list of security trace includes a "detection result history list of all jobs". The "detection result history list of all jobs" includes a plurality of "detection result history lists on a job basis". Each "detection result history list on a job basis" includes a "job ID", a "detection time", a "job outline result", and a plurality of "detection result detailed lists on a page basis". The page detection result of the security trace detection generated by the process of FIG. 10 constitutes one "detection result detailed list on a page basis".

The "job ID" is the information for specifying the detection result history list on a job basis. The "detection time" is the information for specifying the detection time of security trace on a job basis. The "job outline result" is the information for specifying the outline of the detection result on a job basis.

Each "detection result detailed list on a page basis" includes a "page number", a "printing person name", a "printing time", a "printing job log ID", and a "page detection result". The "page number" is the information for specifying the detection result detailed list on a page basis. The "printing person name" is the information for specifying the name of a printing person who printed the document. The "printing time" is the information for specifying a printing time of the document. The "printing job log ID" is the information for specifying a print job of the document. The "printing person name", the "printing time", and the "printing job log ID" are specified based on the additional information added to each page of the document.

For example, the information on the printing person name, the printing time, and the printing job log ID is directly acquired from the additional information extracted from each page. Unique information (information for specifying image data) is acquired from the additional information. The information on the printing person name associated with the acquired unique information, the printing time, and the printing job log ID is acquired from the memory (the ROM 213 or the HDD 260) of the image processing device, or from the communication device connected to the image processing device via the network.

The "page detection result" is the information for specifying the detection result on a page basis. Examples of the page detection result include "additional information cannot be extracted", "additional information can be extracted", "additional information is not added", "mismatching in the extraction data is found", "job is stopped because an error has occurred", "printing person name", "printing time", etc. The printing person name denotes the name of the user who printed the document (page), and so the leaking source may be detected from the printing person name.

The page detection result "additional information can be extracted" means that the additional information can be extracted. The page detection results "additional information has not been added" and "additional information cannot be extracted" have a similar meaning and these page detection results are generated when any additional information cannot be detected from the page although the page to which additional information must be added is checked.

The page detection result "mismatching in the extracted data is found" is a message which may be displayed when two or more pages for security trace are pasted together to form one page. For example, if a page in which the printing person name of Taro is embedded and a page in which the printing person name of Hanako is embedded are pasted together to form one page, then the process of FIG. 10 detects mismatching in the embedded additional information so that this message is displayed. The detection process of security trace outputs a message requesting the user to detect whether such mismatching in the page is appropriate.

The page detection result "job is stopped because an error has occurred" indicates that the detection process is stopped because of an error like the available memory capacity becoming insufficient.

In this embodiment, when at least one among the page detection results respectively indicating that "additional information cannot be extracted", "mismatching in the extracted data is found", "additional information is not added" and "job is stopped because an error has occurred" is detected, the detection part 202 determines that an irregular detection result exists in the page detection results, and updates the job outline result to "see details".

In this embodiment, when only the page detection result indicating that "additional information can be extracted" is detected, the detection part 202 determines that no irregular detection result exists in the page detection results, and updates the job outline result to "additional information can be extracted for all the pages".

In the image processing device of this embodiment, the image-data input part 201 acquires image data of each of a plurality of pages of a document and inputs the acquired image data to the detection part 202. The detection part 202 performs the process of detecting additional information added to each page, based on the image data input by the image-data input part 201, and generates a detection result (page detection result) for every detection. The detection part 202 stores the page detection result in the detection result storing part 204 and updates the job outline result according to the page detection result.

The detection result output part 203 outputs a plurality of page detection results stored in the detection result storing part 204 as well as a job outline result indicating the outline of the plurality of page detection results, and displays the "detection result history list on a job basis" as illustrated in FIG. 7 on the operation panel 250. Viewing the "job outline result" of the "detection result history list on a job basis" of FIG. 7, the user can easily grasp the outline of the detection result on a job basis briefly.

The "detection result history list on a job basis" illustrated in FIG. 7 indicates the detection result history list in the case of the process of falsification detection.

Figure 12:
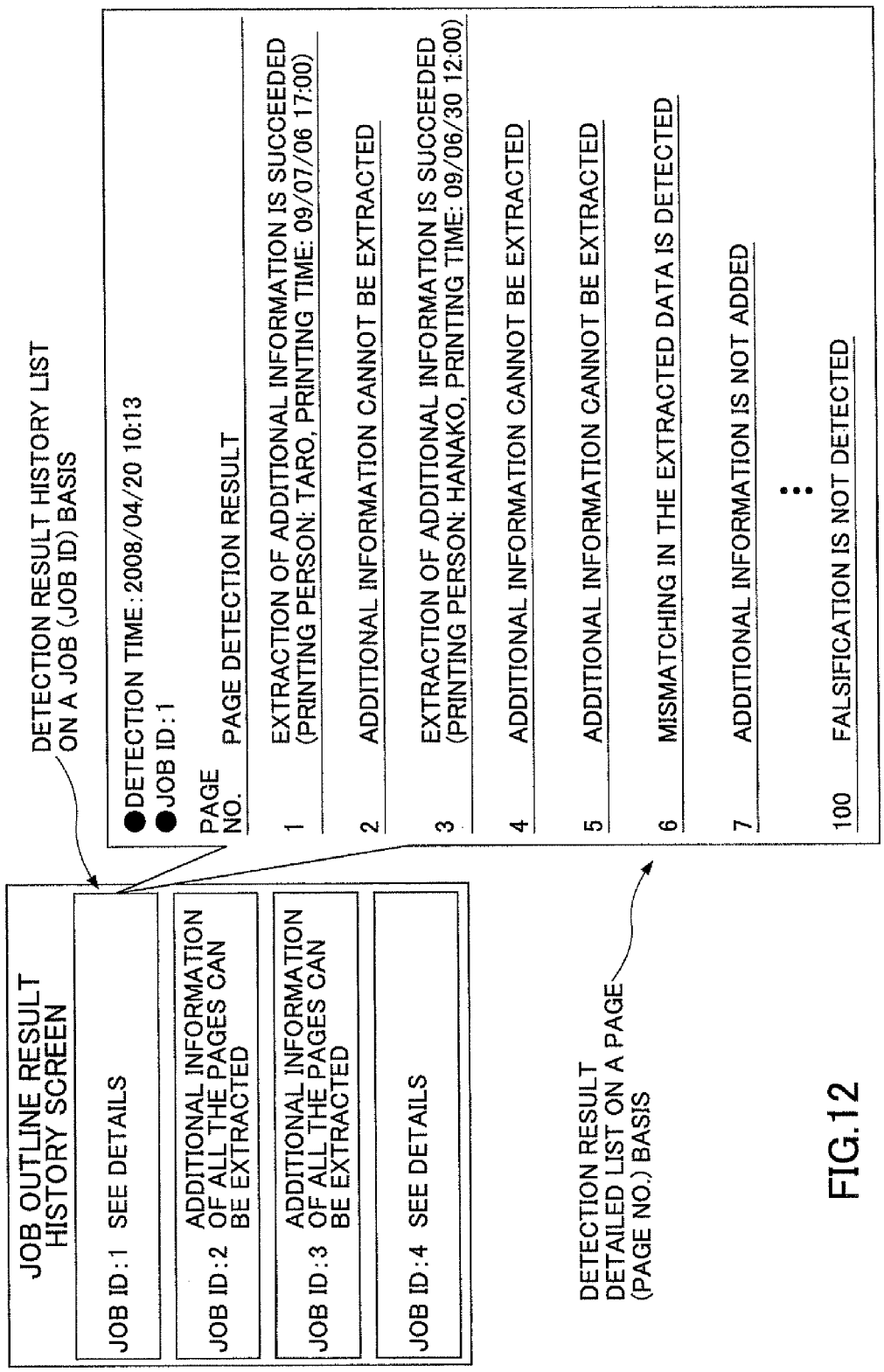
FIG. 12 is a diagram illustrating an example of a detection result history list on a job basis in a case of security trace.

In the case of the detection process of security trace, the "detection result history list on a job basis" illustrated in FIG. 12 is displayed on the operation panel 250. FIG. 12 illustrates an example of a detection result history list on a job basis in the case of security trace.

In the example of FIG. 12, because some irregular detection results ("additional information cannot be extracted", "additional information is not added", and "mismatching in the extracted data is found") are included in the page detection results of the 2nd, 4th, 5th, 6th, 7th, 100th pages of job ID=1, the job outline result of job ID=1 is changed to indicate "seeing details". When the job outline result indicates "see details", it means that an irregular detection result is included in the page detection results.

In the example of FIG. 12, all the page detection results of job ID=2 indicate that "additional information can be extracted", and the job outline result of job ID=2 indicates that "additional information of all the pages can be extracted". When the job outline result indicates that "additional information of all the pages can be extracted", it means that no irregular detection result exists in the page detection results.

Next, a second embodiment of the invention will be described.

In the previous embodiment of FIG. 3, the detection part 202 at step S105 stores the page detection result (generated at step S103) associated with the existing job ID in the detection result storing part 204, and updates the job outline result stored in the detection result storing part 204 according to the page detection result generated at step S103. Then the detection result output part 203 at step S107 displays the updated job outline result mentioned above.

Figure 13:
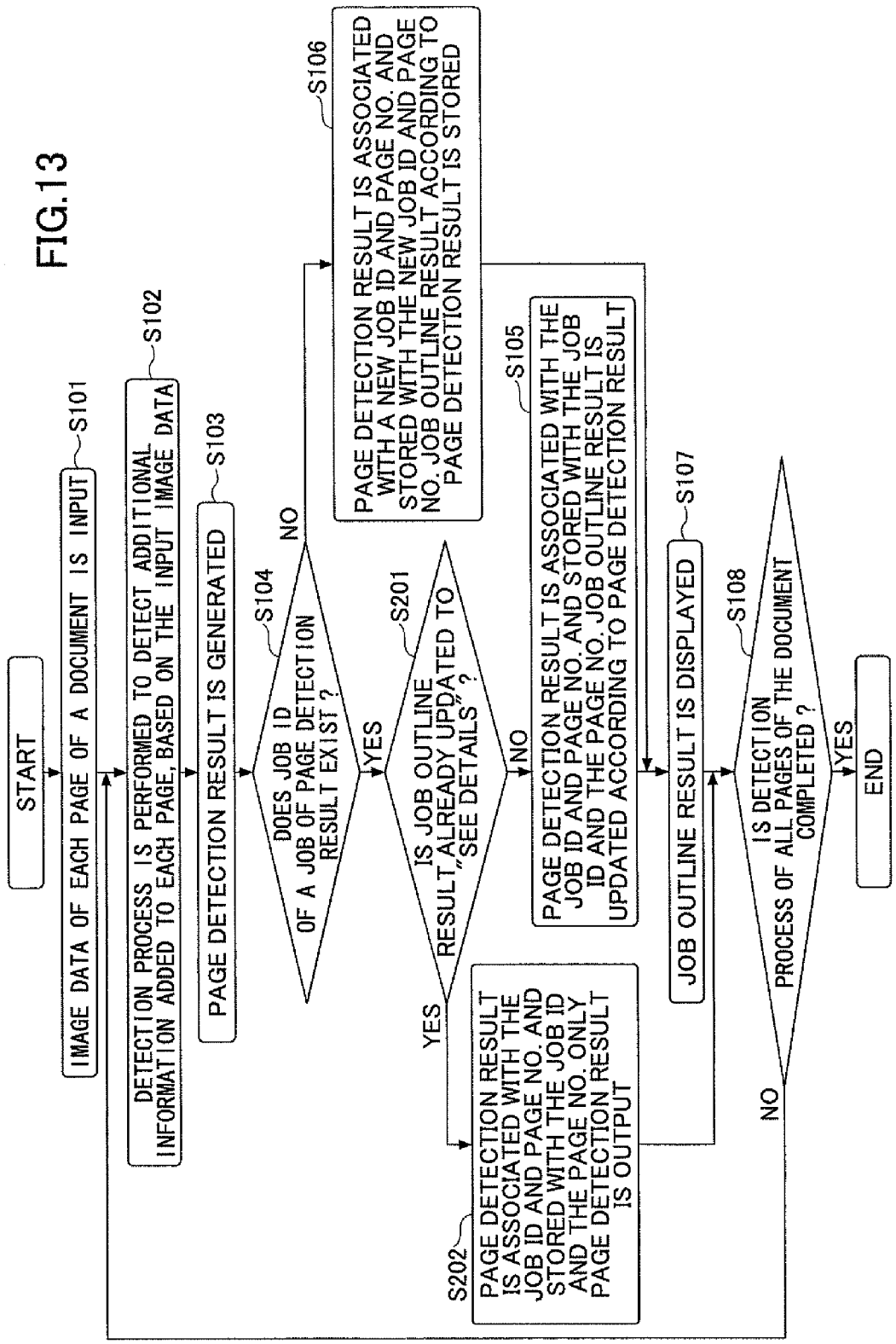
FIG. 13 is a flowchart for explaining a process performed by an image forming device of another embodiment of the invention.
Figure 14:
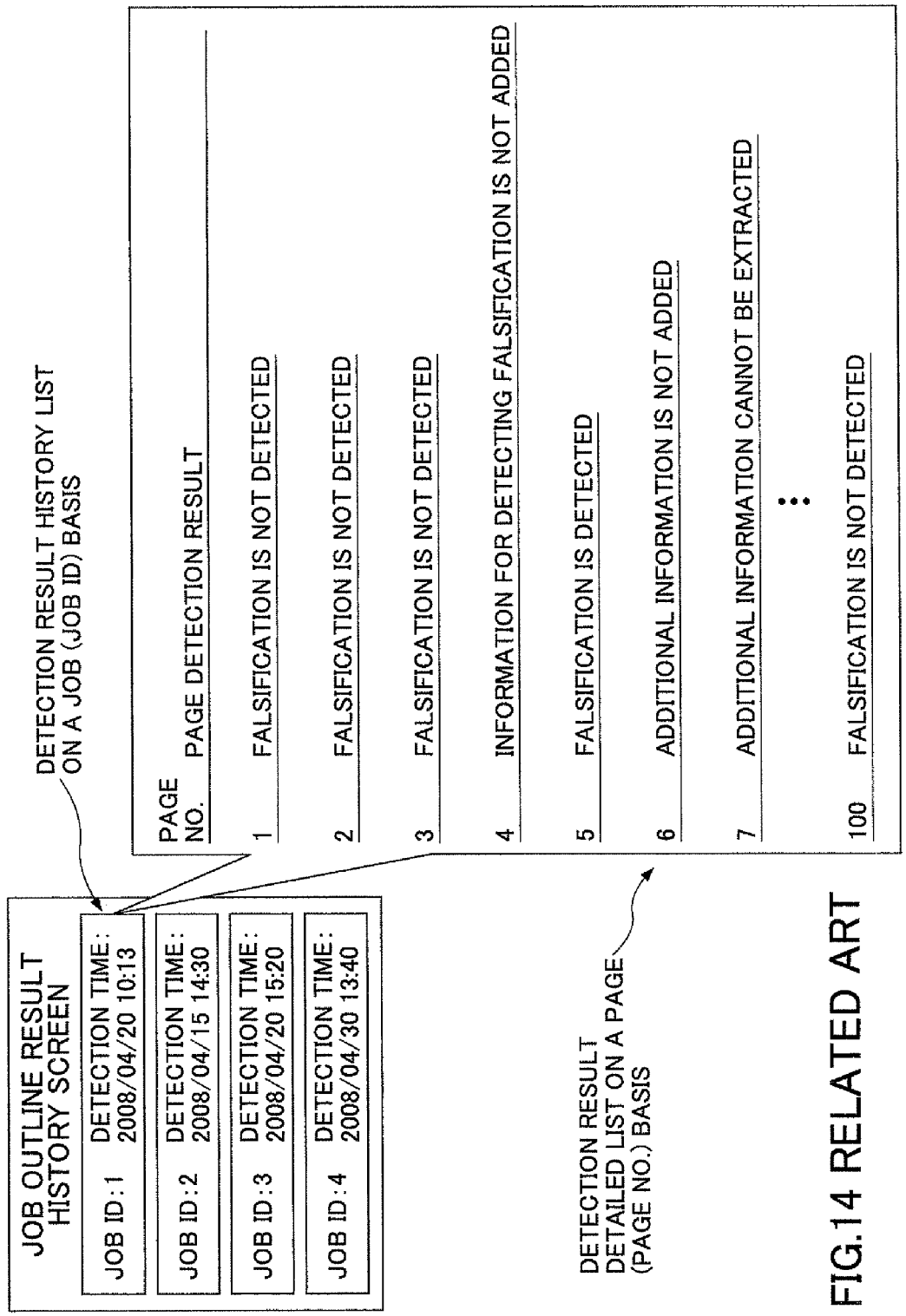
FIG. 14 is a diagram illustrating an example of a detection result history list on a job basis according to the related art in a case of falsification detection.

FIG. 13 is a flowchart for explaining a process performed by an image forming device of a second embodiment of the invention.

In this embodiment, steps S101-S104 of the process of FIG. 13 are performed similarly to those illustrated in FIG. 3. At step S201 of the process of FIG. 13, the detection part 202 determines whether the job outline result stored in the detection result storing part 204 is already updated to "see details".

When the job outline result stored in the detection result storing part 204 is already updated (step S201/Yes), updating the job outline result stored in the detection result storing part 204 according to the page detection result is avoided and the detection result output part 203 simply outputs the page detection result (step S202).

Once the job outline result stored in the detection result storing part 204 is updated to "see details", the job outline result is set to "see details" irrespective of the page detection result generated at step S103, and it is no longer necessary to update the job outline result.

For this reason, the job outline result stored in the detection result storing part 204 is not updated, and the page detection result is simply output. This makes it possible to simplify the process of the previous embodiment and avoid the unnecessary processing operation. Hence, it is also possible to reduce power consumption.

Next, the process performed by the image processing device of this embodiment will be described with reference to FIG. 13.

In FIG. 13, the steps S101-S104 of the process by the image processing device of this embodiment are the same processing as corresponding steps of the process illustrated in FIG. 3, and a description thereof will be omitted.

The detection part 202 determines whether the job ID corresponding to the page detection result generated at step S103 already exists in the detection result storing part 204 (step S104).

When the job ID corresponding to the page detection result already exists in the detection result storing part 204 (step S104/Yes), the detection part 202 determines whether the job outline result stored in the detection result storing part 204 is already updated to "see details" (step S201).

When the job outline result stored in the detection result storing part 204 is already updated to "see details" (step S201/Yes), the detection part 202 at step S202 associates the page detection result (generated at step S103) with the job ID (determined as already existing at step S104) and the page number, and stores the same in the detection result storing part 204. Moreover, at step S202, the detection result output part 203 simply outputs the page detection result generated at step S103 by the detection part 202.

On the other hand, when the job outline result is not yet updated to "see details" (step S201/No), the detection part 202 at step S105 associates the page detection result (generated at step S103) with the job ID (determined as already existing at step S104) and the page number, and stores the same in the detection result storing part 204, and updates the previous job outline result stored in the detection result storing part 204 according to the page detection result (generated at step S103). Other steps in the process of FIG. 13 are performed similarly to corresponding steps in the process illustrated in FIG. 3.

In the image processing device of this embodiment, the detection part 202 is configured so that, when the job outline result stored in the detection result storing part 204 is already updated to "see details", updating the job outline result stored in the detection result storing part 204 according to the page detection result is avoided. At this time, the detection result output part 203 simply outputs the page detection result generated by the detection part 202. This makes it possible to simplify the process of the previous embodiment of FIG. 3 and makes its possible to avoid the unnecessary processing operation.

The present invention is not limited to the specifically disclosed embodiments, and variations and modifications may be made without departing from the scope of the present invention.

For example, the additional information is not limited to that used in the above-described embodiments and various types of information may be usable as the additional information. Moreover, the additional information may be used as control information for inhibiting printing, transmitting, or accumulating of document information in the image processing device.

According to the image processing device, the additional information providing method, and the computer-readable storage medium of the embodiments of the invention, the user can easily grasp immediately the outline of page detection results of additional information added to respective pages of a document.

The process by the image processing device of the above-described embodiment may be carried out by using the hardware composition, the software composition or both the hardware composition and software composition in combination.

When the process is carried out by using the software composition, a computer-readable program 261 in which the processing sequence of the process is recorded may be installed in the memory of a computer in the dedicated hardware so that the process is performed according to the program 261. Or, the program 261 may be installed in a general-purpose computer so that the process is performed according to the program 261.

For example, the program 261 may be stored beforehand on the HDD 260 or the ROM 212 of the multi-functional peripheral 100 as a storage medium. Alternatively, the program 261 may be stored or recorded on a removable storage medium 281 temporarily or permanently. The removable storage medium 281 may be provided as a software package.

Examples of the removable storage medium 281 may include a floppy disk, a CD-ROM (compact disc read-only memory), a MO (magneto-optic) disk, a DVD (digital versatile disc), a magnetic disc, a semiconductor memory, a USB memory, etc.

The storage-medium drive part 280 reads out the program 261 from the removable storage medium 281 attached to the storage-medium drive part 280, and the program 261 from the removable storage medium 281 is installed in the HDD 260. Alternatively, the program 261 may be transmitted from a download site to a computer through a wired or wireless network, and the program 261 may be installed in the HDD 260 of the computer via the communication interface 270.

The image processing device of this embodiment may be arranged so that the process is sequentially performed according to the processing operation of the above-mentioned embodiment, or, if needed for the throughput of the image processing device, the process is performed in parallel or individually.

The present application is based on Japanese patent application No. 2008-211092, filed on Aug. 19, 2008, and Japanese patent application No. 2009-164032, filed on Jul. 10, 2009, the contents of which are incorporated herein by reference in their entirety.

What is claimed is:

1. An image processing device which provides a detection result of additional information added to each of one or more pages which constitute a document, comprising:
an input part configured to input image data of each page of a document;
a detection part configured to generate a page detection result of additional information added to the image data, the page detection result being generated on a page basis and indicating a result of detection of the additional information for each page; and a detection result output part configured to output an outline result indicating an outline of the page detection results for the respective pages on a document basis, together with an identifier of the document associated with the outline result, wherein, when the page detection results of one or more pages of a document indicate that additional information is not added or additional information cannot be extracted, the detection result output part outputs an outline result of the one or more pages indicating that an irregular additional information is detected.

2. The image processing device according to claim 1, wherein, when the page detection results of one or more pages of a document indicate a falsification of image data of the one or more pages, the detection result output part outputs an outline result of the one or more pages indicating that a falsification is detected.

3. The image processing device according to claim 1, wherein the detection part extracts a printing person name from the additional information of each page and detects an integrity of the printing person name in the additional information, and when the page detection results of one or more pages of a document indicate that mismatching in the extracted printing person name exists, the detection result output part outputs an outline result of the one or more pages indicating that an irregular additional information is detected.

4. The image processing device according to claim 3, wherein the detection part extracts at least one of a printing person name and a printing time from the additional information of each page and adds the at least one of the printing person name and the printing time to the page detection result generated for each page.

5. The image processing device according to claim 1, wherein the detection part generates the page detection results of the additional information of the respective pages sequentially in order of the image data of the respective pages being input, and the detection result output part updates the previously output outline result each time a page detection result of the additional information of a new page is generated by the detection part.

6. The image processing device according to claim 1, further comprising a detection result storing part configured to sequentially store the page detection results of the respective pages from the detection part together with the identifier of the document associated with the page detection results.

7. The image processing device according to claim 6, wherein, before the page detection result is stored in the detection result storing part, the detection part detects whether an identifier of the document including the page of the page detection result is stored in the detection result storing part, and wherein, when the identifier of the document is not stored in the detection result storing part, the detection part associates the page detection result with the identifier of the document and stores the page detection result and the identifier associated with the page detection result in the detection result storing part for each page.

8. The image processing device according to claim 6, wherein, before the page detection result is stored in the detection result storing part, the detection part detects whether an identifier of the document including the page of the page detection result is stored in the detection result storing part, and wherein, when the identifier of the document is stored in the detection result storing part, the detection part associates the page detection result with the identifier of the document and stores the page detection result and the identifier associated with the page detection result in the detection result storing part for each page.

9. The image processing device according to claim 6, wherein, when previously generated page detection results of one or more pages of a document stored in the detection result storing part indicate that no falsification of image data of each page is detected, additional information is added or additional information can be extracted, and a subsequently generated page detection result of a following page of the document indicates that a falsification is detected, mismatching of a printing person name is detected, additional information is not added or additional information cannot be extracted, the detection result output part updates a previously output outline result of the document indicating that no falsification is detected to an outline result indicating that an irregular additional information is detected.

10. The image processing device according to claim 9, wherein, when the outline result of one or more pages of the document indicating that an irregular additional information is detected is previously output, the detection result output part does not update the outline result even if a subsequently generated page detection result of a following page of the document indicates that a falsification is detected, mismatching of a printing person name is detected, additional information is not added or additional information cannot be extracted.

11. The image processing device according to claim 6, wherein the detection part extracts, when the additional information is detected as being added to a page of the document, the additional information from the page, and the detection result output part stores the page detection result, including a result of the extraction of the additional information, in the detection result storing part.

12. The image processing device according to claim 11, wherein, when the additional information can be extracted from the page, the detection part detects a falsification of image data of the page, based on the extracted additional information, and the detection result output part stores the page detection result, including a result of the falsification detection, in the detection result storing part.

13. The image processing device according to claim 11, wherein, when the additional information can be extracted from the page, the detection part detects an integrity of a printing person name of image data of the page, based on the extracted additional information, and the detection result output part stores the page detection result, including a result of the printing person name integrity detection, in the detection result storing part.

14. An additional information providing method for an image processing device which provides a detection result of additional information added to each of one or more pages which constitute a document, the method comprising:

inputting, by an input part of the image processing device, image data of each page of a document;

generating, by a detection part of the image processing device, a page detection result of additional information added to the image data, the page detection result being generated on a page basis and indicating a result of detection of the additional information for each page; and outputting, by a detection result output part of the image processing device, an outline result indicating an outline of the page detection results for the respective pages on a document basis, together with an identifier of the document associated with the outline result, wherein, when the page detection results of one or more pages of a document indicate that additional information is not added or additional information cannot be extracted, the outputting step outputs an outline result of the one or more pages indicating that an irregular additional information is detected.

15. A computer-readable storage medium storing a computer-readable program which, when executed by a computer, causes the computer to perform an additional information providing method for an image processing device which provides a detection result of additional information added to each of pages which constitute a document, the method comprising:

inputting, by an input part of the image processing device, image data of each page of a document;

generating, by a detection part of the image processing device, a page detection result of additional information added to the image data, the page detection result being generated on a page basis and indicating a result of detection of the additional information for each page; and outputting, by a detection result output part of the image processing device, an outline result indicating an outline of the page detection results for the respective pages on a document basis, together with an identifier of the document associated with the outline result, wherein, when the page detection results of one or more pages of a document indicate that additional information is not added or additional information cannot be extracted, the outputting step outputs an outline result of the one or more pages indicating that an irregular additional information is detected.

* * * * *